(12) United States Patent
Maor et al.

(10) Patent No.: US 10,410,138 B2
(45) Date of Patent: Sep. 10, 2019

(54) SYSTEM AND METHOD FOR AUTOMATIC GENERATION OF FEATURES FROM DATASETS FOR USE IN AN AUTOMATED MACHINE LEARNING PROCESS

(71) Applicant: SparkBeyond Ltd., Zikhron-Yaakov (IL)

(72) Inventors: Meir Maor, Netanya (IL); Ron Karidi, Herzliya (IL); Sagie Davidovich, Zikhron-Yaakov (IL); Amir Ronen, Haifa (IL)

(73) Assignee: SparkBeyond Ltd., Natania (IL)

( * ) Notice: Subject to any disclaimer, the term of this patent is extended or adjusted under 35 U.S.C. 154(b) by 0 days.

(21) Appl. No.: 15/165,059

(22) Filed: May 26, 2016

(65) Prior Publication Data

US 2017/0017900 A1     Jan. 19, 2017

Related U.S. Application Data

(60) Provisional application No. 62/193,196, filed on Jul. 16, 2015, provisional application No. 62/193,199, filed on Jul. 16, 2015.

(51) Int. Cl.
*G06F 16/28* (2019.01)
*G06N 20/00* (2019.01)
*G06F 16/2455* (2019.01)

(52) U.S. Cl.
CPC ......... *G06N 20/00* (2019.01); *G06F 16/2456* (2019.01); *G06F 16/285* (2019.01)

(58) Field of Classification Search
None
See application file for complete search history.

(56) References Cited

U.S. PATENT DOCUMENTS 6,466,929 B1 * 10/2002 Brown ................ G06K 9/6267
                                                         706/48
8,856,125 B1    10/2014 Malpani et al.
(Continued)

OTHER PUBLICATIONS

Arnold et al. Feature Discovery in the Context of Educational Data Mining: An Inductive Approach. Proceedings of the AAAI2006 Workshop on Educational Data Mining, pp. 7-13. Boston, MA (2006).*

(Continued)

*Primary Examiner* — Alexey Shmatov
*Assistant Examiner* — Robert Bejcek, II (57) ABSTRACT

There is provided a method for generating features for use in an automated machine learning process, comprising: receiving a first training dataset comprising unclassified raw data instances each including a set of objects of arbitrary types; applying a function to each data instance to calculate a set of first results; generating a set of classification features each including the function for application to a newly received data instance to calculate a second result, and a condition defined by a respective member of the set of first results applied to the second result; applying each classification feature to each instance of an unclassified second training dataset to generate a set of extracted features; selecting a subset of pivotal classification features from the set of classification features according to a correlation requirement between classification variable(s) and each respective member of the set of extracted features; and documenting the subset of pivotal features.

21 Claims, 6 Drawing Sheets

(56) References Cited

U.S. PATENT DOCUMENTS

| | | | |
|---|---|---|---|
| 2004/0220839 A1* | 11/2004 | Bonissone | G06Q 10/10 705/4 |
| 2006/0179016 A1* | 8/2006 | Forman | G06Q 10/10 706/16 |
| 2007/0217676 A1 | 9/2007 | Grauman et al. | |
| 2008/0114710 A1 | 5/2008 | Pucher | |
| 2008/0133434 A1* | 6/2008 | Asar | G06N 99/005 706/12 |
| 2008/0201131 A1* | 8/2008 | Kar | G06F 17/30705 704/9 |
| 2008/0221893 A1 | 9/2008 | Kaiser | |
| 2009/0171956 A1 | 7/2009 | Gupta et al. | |
| 2009/0231359 A1* | 9/2009 | Bass, II | G06K 9/626 345/619 |
| 2009/0274434 A1 | 11/2009 | Mei et al. | |
| 2010/0256969 A1 | 10/2010 | Li et al. | |
| 2011/0106741 A1 | 5/2011 | Denneau et al. | |
| 2012/0059779 A1 | 3/2012 | Syed et al. | |
| 2013/0230255 A1 | 9/2013 | Wang et al. | |
| 2013/0279806 A1 | 10/2013 | Tonisson et al. | |
| 2014/0337005 A1 | 11/2014 | Abdel-Hady et al. | |
| 2015/0006443 A1 | 1/2015 | Rose et al. | |
| 2015/0206068 A1 | 7/2015 | Davidovich et al. | |
| 2016/0350671 A1* | 12/2016 | Morris, II | G06N 7/005 |
| 2017/0017899 A1 | 1/2017 | Maor et al. | |

OTHER PUBLICATIONS

TechTarget. key-value pair (KVP). Jan. 17, 2012. searchenterprisedesktop.techtarget.com/definition/key-value-pair.*

Refaeilzadeh, Payam, Lei Tang, and Huan Liu. "Cross-validation." Encyclopedia of database systems. Springer US, 2009. 532-538.*

Hurwitz et al. Key-Value Pair Databases in a Big Data Environment. Big Data for Dummies, p. 89-91, 2013. (Year: 2013).*

Xiang et al. Detecting Offensive Tweets via Topical Feature Discovery over a Large Scale Twitter Corpus. CIKM'12, Oct. 29-Nov. 2, 2012, Maui, HI, USA. (Year: 2012).*

Official Action dated Oct. 24, 2016 From the US Patent and Trademark Office Re. U.S. Appl. No. 15/165,015.

Notice of Allowance dated Feb. 22, 2016 From the US Patent and Trademark Office Re. U.S. Appl. No. 14/595,394.

Official Action dated Jul. 29, 2015 From the US Patent and Trademark Office Re. U.S. Appl. No. 14/595,394.

Neamtiu et al. "Understanding Source Code Evolution Using Abstract Syntax Tree Matching", MSR '05 Proceedings of the 2005 International Workshop on Mining Software Repositories, ACM SIGSOFT Software Engineering Notes, 30(4): 1-5, Jul. 2005.

Sanz et al. "On the Automatic Categorisation of Android Applications",The 9th Annual IEEE Consumer Communications and Networking Conference: 149-153, Jan. 14-17, 2012.

Shabtai et al. "Automated Static Code Analysis for Classifying Android Applications Using Machine Learning", International Conference on Computational Intelligence and Security (CIS): 329-333, Dec. 11-14, 2010.

Applicant-Initiated Interview Summary dated Apr. 20, 2017 From the US Patent and Trademark Office Re. U.S. Appl. No. 15/165,015. (3 Pages).

Official Action dated Mar. 9, 2017 From the US Patent and Trademark Office Re. U.S. Appl. No. 15/165,015. (79 pages).

Official Action dated Oct. 17, 2018 From the US Patent and Trademark Office Re. U.S. Appl. No. 15/165,015 (50 pages).

Applicant-Initiated Interview Summary dated Dec. 26, 2018 From the US Patent and Trademark Office Re. U.S. Appl. No. 15/165,015. (3 pages).

* cited by examiner

SYSTEM AND METHOD FOR AUTOMATIC GENERATION OF FEATURES FROM DATASETS FOR USE IN AN AUTOMATED MACHINE LEARNING PROCESS

RELATED APPLICATIONS

This application claims the benefit of priority under 35 USC 119(e) of U.S. Provisional Patent Application Nos. 62/193,199 and 62/193,196 both filed on Jul. 16, 2015, the contents of which are incorporated herein by reference in their entirety.

FIELD AND BACKGROUND OF THE INVENTION

The present invention, in some embodiments thereof, relates to machine learning and, more specifically, but not exclusively, to systems and methods for selection of features for classification and/or prediction using machine learning.

The process of machine learning includes selection of methods that learn from exiting data to classify and/or predict new data. A set of training data representing a spectrum of examples, which are optionally labeled, is provided. Features are extracted from each member of the set of training data. The features, along with the labeling, are used to train a machine learning method, for example, a statistical classifier, to classify and/or predict new unseen data, based on the assumption that the unseen data is based on a distribution similar to that of the training set.

In order to try and obtain accurate prediction, data scientists invest considerable time and effort in the manual design and construction of the features for each classification and/or prediction problem, for example, financial forecasting.

SUMMARY OF THE INVENTION

According to an aspect of some embodiments of the present invention there is provided a computer implemented method for generating features for use in an automated machine learning process, comprising: receiving a designation of a first training dataset comprising a plurality of raw data instances, each instance including a set of objects of arbitrary types, each object assigned at least one value, the raw data instances being unclassified; applying a function to each data instance to calculate a set of first results, the function being adapted to process at least one object of the set of objects of each instance, the function being adapted to process objects of arbitrary type; generating a set of classification features for application to a newly received data instance, each classification feature including the function for application to the newly received data instance to calculate a second result, and at least one condition defined by at least one respective member of the set of first results applied to the second result; applying each feature of the generated set of classification features to each instance of a second training dataset of unclassified raw data to generate a set of extracted features; selecting a subset of pivotal classification features from the set of classification features according to a correlation requirement between at least one classification variable and each respective member of the set of extracted features; and documenting the selected subset of pivotal features for use in an automated machine learning process.

Optionally, the method further comprises training a statistical classifier for classification of the at least one classification variable based on the selected subset of pivotal features applied to a third training dataset. Optionally, the method further comprises classifying a new data instance to the at least one classification variable by applying each classification feature of the selected subset of pivotal features to the new data instance to extract a plurality of features and applying the statistical classifier to the plurality of extracted features.

Optionally, applying the function comprises applying each function of a set of functions to each data instance to generate a plurality of sets of first results, wherein each respective function is adapted to process different objects.

Optionally, the at least one condition comprises equality with the respective member of the set of first results.

Optionally, the at least one condition is selected to generate a classification feature of a binary type by selecting a function that implements a binary condition.

Optionally, the at least one condition comprises greater-than or less-than the respective member or a value calculated from the respective member of the set of first results.

Optionally, each member of the set of first results includes a set of values, and the at least one condition comprises membership in at least one respective set.

Optionally, the at least one condition further comprises that the membership in each respective set is greater-than or less-than at least one other respective member of the set of first results.

Optionally, at least one member of the set of first results includes a set of values, and the at least one condition comprises an aggregation function applied to at least one respective set.

Optionally, at least one member of the set of first results includes a set of key-value pairs, and the at least one condition comprises equality with the respective key of a certain pair and a member selected from the group consisting of: greater than, less than, and equal to, the value of the certain pair. Optionally, the at least one condition is applied to each member of the set of key-value pairs to generate a second set of sub-results, and further comprising applying another at least one aggregation function to the second set of sub-results.

Optionally, the arbitrary types are members selected from a set consisting of: time series, vector, map, graph, and tree.

Optionally, each instance includes at least two objects having a similar data structure each including a plurality of parameters storing similar representations of similar data, and further comprising creating, for each common value of each parameter of the similar data structure, a set of values of the other parameters of the similar data structure, and wherein applying the function to each data instance to generate a set of first results comprises applying the function to the set of values of the other parameters of the similar data structure.

Optionally, the first training dataset and the second training dataset are the same or overlap.

According to an aspect of some embodiments of the present invention there is provided a system for generating features for use in an automated machine learning process, comprising: a data interface for communicating with a storage unit storing thereon at least one training dataset comprising a plurality of raw unclassified data instances, each instance including a set of objects of arbitrary types, each object assigned a value, and storing a set of functions adapted to process to each data instance to generate a plurality of sets of first results, each function adapted to process objects of arbitrary type; a program store storing code; and a processor coupled to the data interface and the program store for implementing the stored code, the code comprising: code to apply at least one function from the set of functions to each data instance to calculate a set of first results, the function being adapted to process at least one object of the set of objects of each instance; code responsive to the set of first results, to generate a set of classification features for application to a newly received data instance, each feature including a calculated second result of the function applied to the newly received data instance and an application of at least one condition defined by each member of the set of first results to the second result; code responsive to the generated set of classification features to apply each classification feature of the generated set of classification features to each instance of a second training set of raw unclassified data instances stored on the storage unit to generate a set of extracted classification features, to select a subset of pivotal features from the set of classification features according to at least one correlation requirement between at least one classification variable and each respective member of the set of extracted features, and to store the selected subset of pivotal features in the storage unit for use in an automated machine learning process.

Optionally, the system further comprises a user interface coupled to the processor, the user interface set to allow a user to input the at least one classification variable.

Optionally, the system further comprises a user interface coupled to the processor, the user interface set to allow a user to select the at least one function from the set of functions.

Optionally, the system further comprises code to train a statistical classifier for classification of the at least one classification variable based on the selected subset of pivotal features applied to the training dataset.

Optionally, the at least one correlation requirement includes a threshold for a predefined processing time for predicting the at least one classification variable using a target processing unit.

According to an aspect of some embodiments of the present invention there is provided a computer program product comprising a non-transitory computer readable storage medium storing program code thereon for implementation by a processor of a system for generating features for use in an automated machine learning process, the program code comprising: instructions to receive a designated first training dataset comprising a plurality of raw data instances, each instance including a set of objects of arbitrary types, each object assigned at least one value, the raw data instances being unclassified; instructions to apply a function to each data instance to calculate a set of first results, the function being adapted to process at least one object of the set of objects of each instance, the function being adapted to process objects of arbitrary type; instructions to generate a set of classification features for application to a newly received data instance, each classification feature including the function for application to the newly received data instance to calculate a second result, and at least one condition defined by at least one respective member of the set of first results applied to the second result; instructions to apply each feature of the generated set of classification features to each instance of a second training dataset of unclassified raw data to generate a set of extracted features; instructions to select a subset of pivotal classification features from the set of classification features according to a correlation requirement between at least one classification variable and each respective member of the set of extracted features; and instructions to document the selected subset of pivotal features for use in an automated machine learning process.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to machine learning and, more specifically, but not exclusively, to systems and methods for selection of features for classification and/or prediction using machine learning.

An aspect of some embodiments of the present invention relates to systems and/or methods that automatically generate pivotal classification features for classification of an arbitrary data instance to one or more classification variables. The pivotal classification features are generated from a training dataset of raw unclassified data that includes multiple data instances, each instance represents an observation of unknown classification and includes or associated with multiple objects which may be of an arbitrary data type or defined data type, optionally complex objects, for example, time series, vectors, maps, graphs, sets and trees. A base function (which may be a complex function comprised of multiple building block functions) is applied to the corresponding object(s) of each instance (e.g., a time series) and/or to a set of objects (e.g., to a pair including a time series and a date) to calculate a first set of results. The first results may include objects of arbitrary type. Classification features (set to process a new data instance) are generated by including the base function and condition(s) defined by respective member(s) of the set of first results applied to a second result created by the base function processing the new data instance.

A subset of pivotal features is selected from the generated set of classification features, optionally according to one or more correlation requirements between the one or more classification variables and respective classification feature member. The best correlated features, defined according to one or more correlation requirements, are selected. Optionally, a statistical classifier (or other machine learning method and/or predictive method) is trained by applying the selected pivotal features to a training set (which may include the same set used to generate the features and/or another training set). The statistical classifier may be used to classifier (or predict) a newly received data instance to the one or more classification variables.

Optionally, the condition is selected to generate a classification feature of a binary type, for example, a Boolean type (e.g., generating a true or false value, a 0 or 1, or other binary values). The function may be designed to return a binary type. The function may implement a binary condition. Optionally, the condition includes a relative comparison between the second result and the respective member of the first result. Optionally, the condition is selected from the group: equal to, greater than, less than, greater than or equal to, less than or equal to, membership in a set, within a range, and/or a value calculated from the respective member (e.g., a percentile). In this manner, the same binary feature may be designed to operate on arbitrary objects, without necessarily requiring identification of the actual object data type. The classification feature may be generated independently of the object data type. Different features do not necessarily need to be specially defined for different data types.

Alternatively or additionally, the condition includes an aggregation function applied to the object, for example, maximum, minimum, and average. In this manner, classification features may be generated for complex object types having multiple parameters (e.g., sets, vectors, trees, graphs, maps), without necessarily requiring identification of the actual object data type, and/or low level implementation of the feature according to different object data types.

It is noted that multiple conditions may be used, for example, nested and/or applied iteratively, as described herein. The conditions may be automatically generated by code (e.g., as combinations of building block conditions), and/or manually inputted by a user.

The systems and/or methods described herein improve automated machine learning methods, by identifying classification features from raw training data instances, and setting pivotal features for classification of new received data instances. The classification features are generated for arbitrary objects, independently of the actual object implementation type, and/or without requiring knowledge of the actual object type. Pivotal features are identified from raw data, which may be in unclassified form, not necessarily requiring classification of the raw data for processing. The raw data does not necessarily need to be formatted in a particular way.

The systems and/or methods described herein generate a new set of data (which may be stored locally and/or remotely, or transmitted to another server) that includes the selected pivotal features. The new data set of pivotal features may be implemented by machine learning processes for improving the machine learning process, such as in terms of improvements in classification accuracy, improvements in computing resources utilization, and/or improvements in time taken to perform the classification.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms classify and predict are interchangeable.

As used herein, the term statistical classifier (or classifier) broadly means a predictive model and/or classification machine learning model, for example, a statistical classifier, a regression function, a look-up table, decision tree learning, artificial neural networks, and Bayesian networks.

As used herein, the term function means a relation between inputs and outputs such that each input is related to one output. The function performs an operation on the input(s) to generate the output(s), for example, a mathematical calculation, and/or other data processing methods such as data analysis. Functional may be mathematical functions, and/or functions designed to process data, such a numeric and/or non-numeric data. Examples of functions include: a function that operates on text and returns the sentiment of the text (e.g., positive, negative, or neutral), a function that converts a string to upper case, and/or a function that performs a mathematical operation on numerical data.

Figure 1:
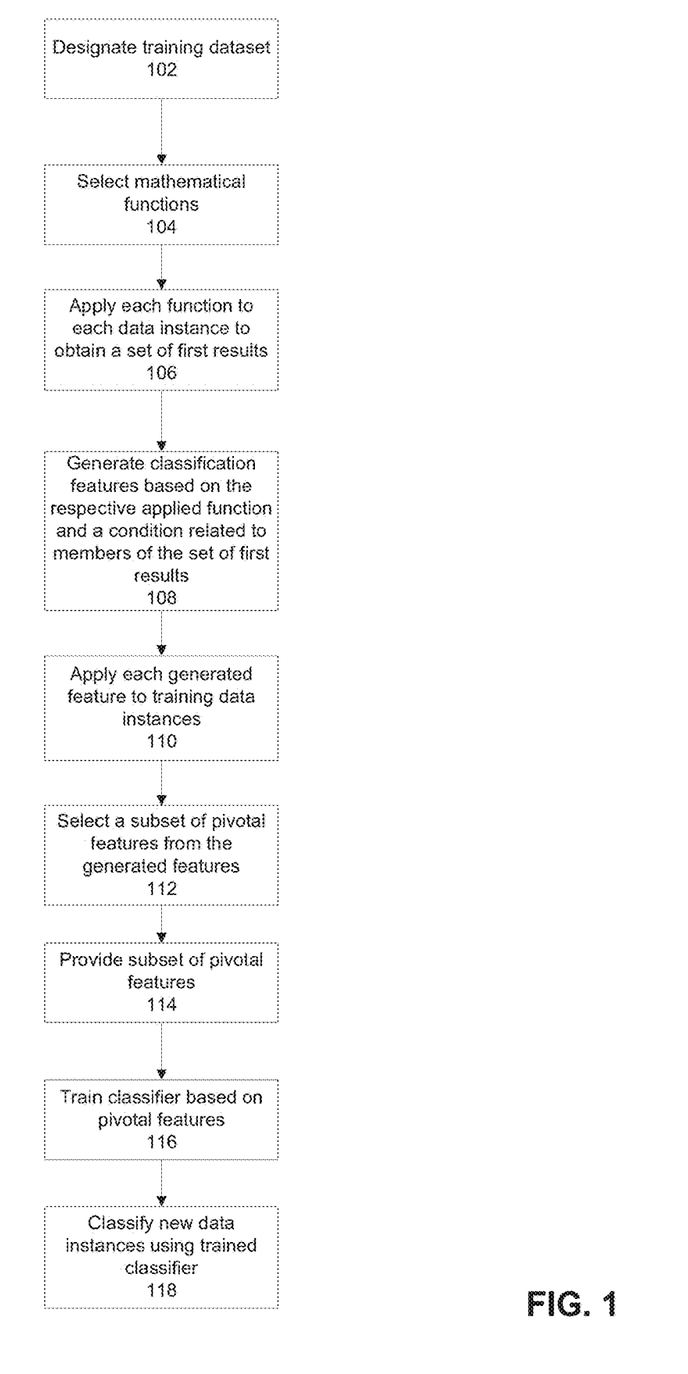
FIG. 1 is a flowchart of a process of automatically generating pivotal classification features from raw unclassified data, that classify and/or predict a new received data instance, in accordance with some embodiments of the present invention.
Figure 2:
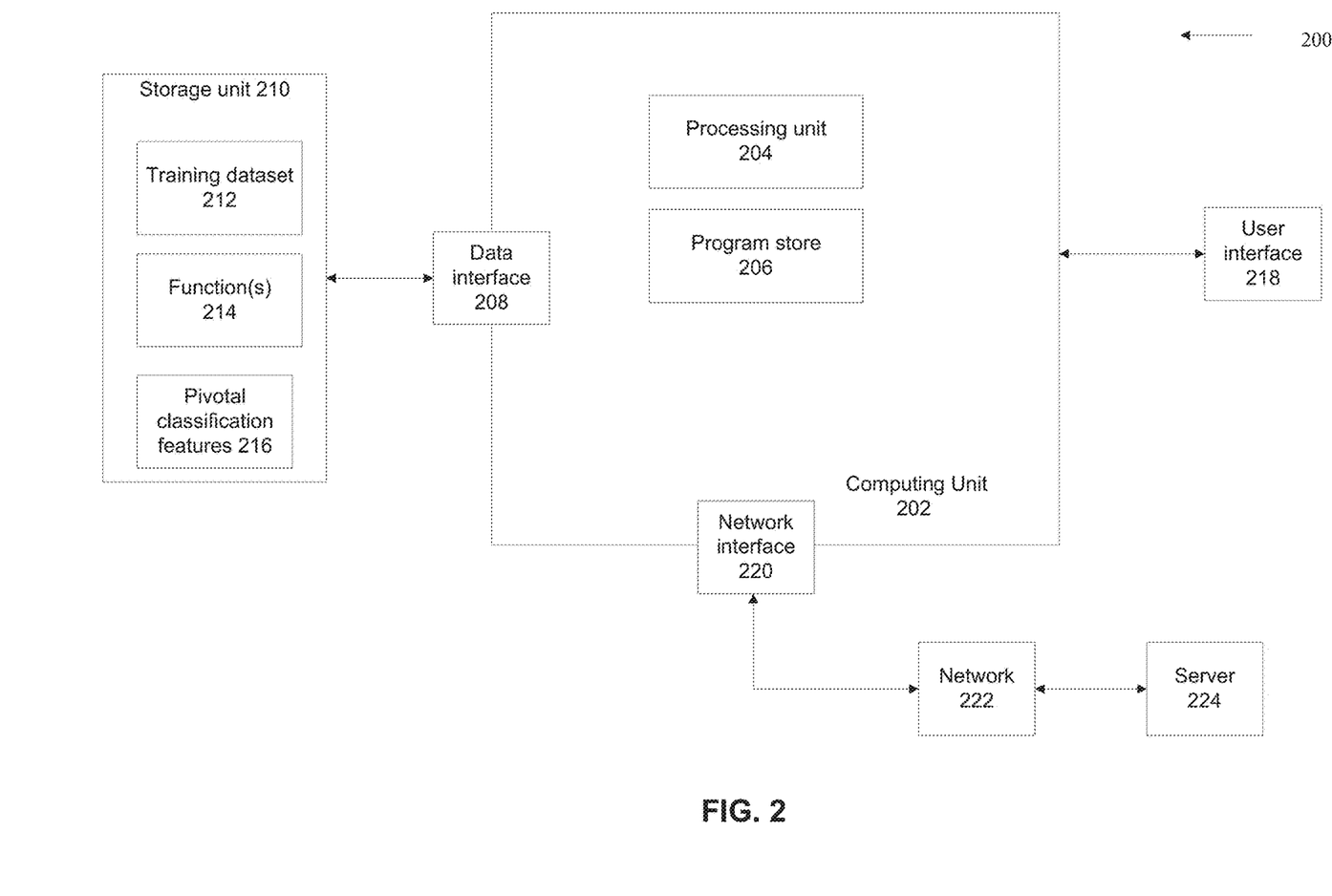
FIG. 2 is a block diagram of components of a system that automatically generates pivotal features from raw unclassified data that classify and/or predict a new received data instance, in accordance with some embodiments of the present invention.

Reference is now made to FIG. 1, which is a flowchart of a process of automatically generating pivotal classification features from raw unclassified data that classify and/or predict a new received data instance, in accordance with some embodiments of the present invention. Reference is also made to FIG. 2, which is a block diagram of components of a system that automatically generates pivotal classification features from raw unclassified data that classify and/or predict a new received data instance including a set of objects of arbitrary type. The generated features may accurately predict the data instance in a resource limited computing system (i.e., finite processing resources and storage) within a reasonable time frame (e.g., to allow users to act upon the result, to free up the resources for other uses), which may be a predefined time (e.g., manually inputted by the user, automatically selected by code, and/or obtained from a system configuration file). The method of FIG. 1 may be executed by the system of FIG. 2.

The systems and/or methods described herein attempt to improve an underlying technical process within the technical field of machine learning. The technical problem addressed is that of designing features to apply, using a machine learning method (e.g., statistical classifier), to a received data instance, to classify and/or predict a classification variable, where the classification is performed in a machine learning and/or classification computer system having limited processing capabilities and limited storage capacity, within a reasonable time frame. Although a virtually infinite number of classification features may be extracted from a data instance (e.g., using different combinations of base functions), application of machine learning methods to the data instance are computationally intensive (in terms of resources and/or time), which practically requires selection and/or design of a limited pivotal feature set. The pivotal feature set is selected to be accurate (i.e., provide a high correlation to the classification variable) and/or generate the classification result using the resource limited machine in a reasonable time (e.g., on the order of seconds, hours or days, instead of, for example, months and years). The systems and/or methods described herein are designed to generate a new set of data including the pivotal feature set that is statistically accurate and/or may be executed in the resource limited computer system in the reasonable time frame.

The systems and/or methods described herein improve performance of the computer system executing the classification method and/or executing the machine learning method, by generating and/or selecting the set of features that improve computing resource utilizing (e.g., processor utilization and/or storage requirements), for example, in comparison to other methods, and/or according to a predefined utilization requirement (e.g., designed to operate on a single CPU) and/or predefined time requirement.

The systems and/or methods described herein provide a unique, particular, and advanced technique of feature generation. The systems and/or methods described herein process data organized in a specific manner, namely as data instances (described herein), to generate other new data organized in a specific manner, namely a set of features (as described herein).

The systems and/or methods described herein attempt multiple transformations (i.e., classification features) on objects, which may be complex objects, to identify the transformations that are associated with a statistically significant relation with a target and/or dependent variable. The set of transformations to attempt may not be necessarily known in advance without evaluation using the training dataset. Generation of the classification features may be performed by incorporation of data from the complex objects. The transformations are evaluated, and the statistical relevance and/or predictive power in predicting or classifying the classification variable. After an initial set of relevant transformations have been identified, the set may be further narrowed (e.g., applying feature selection techniques). The final set of transformation may be used to create a predictive model combining the identified features.

System 200 includes computing unit 202, for example, a personal computer, a mobile device (e.g., Smartphone, Tablet), a wearable device (e.g., computing glasses), and/or a server. Computing unit 202 includes a processing unit 204, for example, a central processing unit (CPU), a graphics processing unit (GPU), field programmable gate arrays (FPGA), digital signal processor (DSP), and application specific integrated circuits (ASIC). Processing unit 204 may include one or more processors (homogenous or heterogeneous), which may be arranged for parallel processing, as clusters and/or as one or more multi core processing units.

Computing unit 202 includes a program store 206 storing code implementable by processing unit 204, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Computing unit 202 may include multiple computers (having heterogeneous or homogenous architectures), which may be arranged for distributed processing, such as in clusters.

Computing unit 202 includes a data interface 208 for communicating with a storage unit 210, which may be installed within computing unit 202, as an external device (e.g., accessible via a local connection), and/or located on a remote server 224, accessible over a network 222 via a network interface 220 (which may be integrated with data interface 208).

Computing unit 202 may include a user interface 218, for example, one or more of: a display, a touch screen, a keyboard, a mouse, and voice activated interface.

Blocks of the method of FIG. 1 may be represented as instructions in code stored in program store 216, implementable by processing unit 204.

At 102, a training dataset is designated. Training dataset 212 may be stored on storage unit 210, accessible by processing unit 204 using data interface 208, and/or retrieved from a remote server, for example, from an online document store. Designation may be performed manually by a user (using user interface 218), and/or automatically by code, and/or based on a file defining system configuration parameters. Training dataset 212 may be designated from a larger collection of data, for example designated according to the classification variable described herein.

The training dataset includes multiple data instances, each including a set of objects of arbitrary types, each object assigned one or a set of values. Each data instance represents an observation that may be predicted or classified. Optionally, the training data set includes raw data, for example, generated as an output of a sensor (or other measurement device), and/or generated as an output of a computer process implemented by code. Optionally, the raw data instances are unclassified.

Each object is represented by a data structure, optionally a complex data structure storing multiple parameters. The data structure of each object is of an arbitrary type, which does not necessarily need to conform to a specific format for processing by the systems and/or methods described herein. Objects may be, for example, of complex types: time series, vector, map, graph, and tree. Objects may be, for example, of simple types: integer, real number, string, categorical (i.e., set), and Boolean. It is noted that the complex types may be built from the simple types.

The training set may include objects which describe, for example, events, bids, potential client characteristics, sensor readings, log records, and/or any other set of records numerical and/or any textual records which reflect events and/or measurements, and optionally one or more event and/or measurement outcomes, estimations or evaluations (which may be used as labels for the data objects for training a classifier, as described herein).

The training dataset may be stored, for example, as a table, matrix, and/or database, with each row representing respective data instances, and each column representing objects.

The data instances may be represented mathematically as $D=(D1, \ldots, Dn)$. $Di$ (e.g., a row) may include columns $Di=(Di1, \ldots Dik)$. Each $Dij$ may represent an object as an entry.

It is noted that the training set may be generated from raw data, for example, from obtaining complex objects from an operational system, an online document store, and/or by joining data together (e.g., joining tables). Raw data (used as the training dataset, or used to generate the training dataset) may be stored in tabular form (or other corresponding representation), optionally in multiple interlinked tables, for example, in relational databases. In one example, operational systems may use object oriented data structures (which may be used to create the training set) where complex objects have various interlinks between them. A flat form of the object oriented data structures may be created (e.g., by code having instructions to perform such conversion) before analysis described herein is performed, or alternatively, the object oriented data structures are processed using existing forms or other modified forms. Data objects which do not have a 1-1 relationship with a primary table (or other data structure) may be joined, for example, using an aggregated method for each joined column. For example, aggregation of historical data (e.g., stock prices and respective dates) may be performed by creation of a time series.

Exemplary methods of automatic joining of data to create an enhanced training dataset are described with reference to U.S. Provisional Patent Application No. 62/193,199, assigned to the same entity, and by some of the same inventors, incorporated herein by reference in its entirety. The method of Application No. 62/193,199 may be used to join multiple tables and/or files of relational data to create a set of complex objects, where each object may include primitive types and/or sets of primate types, for example, time series or other sets of other objects. At 104, one or more functions are selected and/or designated, manually by a user (e.g., using user interface 218) and/or automatically by code. Functions may be selected from a function repository 214 stored on storage unit 210, for example, functions designed to process numbers, text, and/or geographical data. Alternatively or additionally, functions may be created, for example, by code programmed to automatically create functions. Alternatively or additionally, functions may be manually entered by the user (e.g., using user interface 218).

Each function is designed to process one or more objects of a data instance. When the function is applied to multiple data instances, the function processes corresponding data objects of data instances. Each function may process the entire data instance, or designated object components of the data instance.

Functions are designed to operate on objects having arbitrary type and/or value. Functions may return (i.e., generate an output) objects of arbitrary type. The functions are designed to process objects in a similar manner, without consideration of the actual object implementation data type. For example, functions may be written in a domain specific language, in an abstract manner to operate on objects without necessarily requiring prior knowledge of the type implementation of the object.

Functions may be composition of other functions, such as building block functions.

Functions output may be the same type as the object, and/or a designated type independent of the actual object type. The selected set of functions may be mathematically represented as F, with each function of the set represented as $f$. Each function may operate on one or more objects (or entries) Dij in the table representation.

The set of functions may be selected according to the problem domain and/or domain related to the data instances. In such cases the set of functions may be selected to achieve classification results with a suitable correlation according to a correlation requirement.

At 106, each function of the selected function is applied to the data instances of the designated training set, optionally, to each data instance (or to a designated subset of data instances). The application of each function generates a set of first results (per function). The set of first results includes members generated by the application of a certain function to the data instances.

Optionally, each function of the set of functions is designed to process different objects. In this manner, each object of the data instance may be processed by one or more functions.

Mathematically represented, given data set D, a certain function $f$ in the function set F, $O(f)$ denotes the set of first set of results or output values $f(Dn)$ where Dn is a data instance. For example, if an object in each data instance represents a set of books, function $f$ returns the name of the respective author, then $O(f)$ includes the names of all authors in the object of the data instance. In another example, if an object includes a set of time series, and $f$ is a function that applies a Fast Fourier Transform (FFT) on a time series and returns a vector of coefficients, then $O(f)$ is the set of all coefficient vectors in the object of the data instance.

Optionally, the first function is applied to data instances that include two or more objects having a similar data structure. Each data structure includes multiple parameters storing similar representations of similar data, such as two data instances having objects of similar data structures storing the same or similar values for the parameters of the object. For example, in a case of data instances representing purchases of products (by the same or different users), the data instances may contain multiple parameters having the same values, each representing a single purchase (by the same or different users) of the same product. In such a case, the objects having the same or similar values may be grouped together.

Optionally, the code creates, for each common value of each parameter of the similar data structure, a set of values of the other parameter(s) of the similar data structure. A set is created that stores, for each common key (i.e., common value, e.g., a product) the set of values of the other parameter(s) (i.e., one or more parameters different than the key). For example, the data instances may include objects, each representing a purchase of a product, represented by the data structure tuple (product, buyer, date, monetary value). It is noted that there are multiple tuples having the same value for product, for example (t-shirt, Sam Smith, 14-Jun.-2015, $10), and (t-shirt, Jack Black, 16-Jun.-2015, $15). The prediction goal may be to predict the total value of sales of a certain product for the next week. The code creates a map, based on each different value of product (e.g., t-shirt), that maps the value of product to a vector of one or more of the other parameters, such as date, buyer, and monetary value. For example t-shirt→($10, $15).

Now, the function is applied to the set of values of the other parameter(s) of the similar data structure (since the key is a common value). For example, when the function results an average from a vector, the set of first results, applied to the above would be $12.5. As discussed below, one of the generated features would be Average of purchase of new product(s)>$12.5.

At 108, a set of classification features is generated.

Each feature includes a function (e.g., complex function and/or composition function) that receives a data instance (e.g., a row Dn) as input, and returns an object. The object returned by the function may be of type Boolean (e.g., having True or False values, or other binary types), a number (e.g., integer or real), a string, or a general object of arbitrary type.

Each feature is composed of one of the functions of the selected function set and one or more conditions defined by a member of the set of first results. Applying the respective function (from the set of functions) to the new received data instance generates a second (e.g., intermediate) result. The condition(s) is used to evaluate (or compare) the second result against the member of the set of first results. The feature outputs the result of the evaluation (or comparison).

The condition may be a complex condition, composed of multiple sub-conditions, which may be nested.

The generation is performed to cover all combinations (or relevant combinations, or selected subset of combinations)

of each function of the set of functions with the comparison applied to each member of the set of first results.

Optionally, the feature is generated to output a Boolean value (or other binary values). Optionally, the features based on conditions of equality, comparison of a predefined order, and membership in a set generate Boolean values. In this manner, features may be applied to objects of arbitrary type to generate the same Boolean type result.

Optionally, the condition includes an equality that compares the intermediate (or second) result with the respective member of the first set of results. In terms of mathematical representation, for every output value o in O($f$), a feature may be represented as $f(\ )==o$. For example, when the function returns the author of the books in the object, generating the first result set {Asimov, Clancy}, each member of the set is used to generate the features: feature 1: $f(book)==Asimov$; feature 2: $f(book)==Clancy$.

Alternatively or additionally, the condition includes a comparison based on a predefined order. The condition may be greater-than (or greater-than or equal to) or less-than (or less-than or equal to) the respective member of the set of first results. In terms of mathematical representation, features map be represented as $f(\ )>o$ or $f(\ )<o$. For example, if function $f(v)$ computes an L2 norm of v, then an example of one feature is $f(v)>10$ (i.e., when one of the L2 norms in the set of first results is 10).

Alternatively or additionally, the condition includes membership in the respective member of the set of first results. The membership condition may be applied when the function of the selected function set outputs a set of results, for example, a vector. The condition may include membership in the least one set of results. In terms of mathematical representation, the feature may be represented as $f(x)$ contains y for every element y that is contained in every o (which is a set) in O($f$). For example, when a result of the set of first results includes a vector o contains the value zero, a feature may be generated indicating whether vector $f(x)$ contains a zero value. For example, if $f(book)$ returns the genres of a book, then one of the generated features may be $f(book)$ contains romance.

Alternatively or additionally, the membership condition may include a comparison based on a predefined order. The condition may include that the membership in one or more (e.g., each) respective sets is greater-than or less-than one or more (e.g., each) other respective member of the set. In terms of mathematical representation, check whether $f(x)$ contains a value v such that v>y. In another example, check whether $f(x)$ contains a value v such that v is within a predefined range.

Alternatively or additionally, the condition includes an aggregation function applied to the respective member of the set of the first results, for example, minimum element value in the set, number of elements in the set, size of the set, average value of elements in the set, and maximum element value in the set. The membership condition may be applied when the function of the selected function set outputs a set of results, for example, a vector. The aggregation function may be combined with other comparison operators, to generate combined conditions. In terms of mathematical representation, if v is an element in the set outputted by $f(Dn)$ for a data instance from the data set D, p is a function defined for type v, w is of the form p(v) for some v that belongs to $f(Dn)$ where Dn is in data set D, and g is an aggregation function applied over the results of p( ), then examples of features with complex conditions include g({v in $f(Dn)$ such that p(v)==w}). If $f(Dn)$ returns a list of all words in a document, p(v) returns the number of letters in a document, and g( ) is the size then g({v in $f(Dn)$ such that p(v)==5}) returns the number of 5 letter words in a document. Other examples of features include g({v in $f(Dn)$ such that p(v)<=w}), and g({v in $f(Dn)$ such that p(v)>=w}).

Alternatively or additionally, when one or more (e.g., each) members of the set of first results is a set of key-value pairs, the condition includes equality with a respective key of a certain pair and a comparison based on a predefined order applied to the value. For example, each member of the set of first results may include a set of maps from keys to values, such as time to temperature. In terms of mathematical representation, for each key-value pair (k, v) check whether $f(Dn)$ contains a key-value pair with the same key k and value greater than v (or less than v, or equal to v). An example feature includes Temperature(midnight)>2 degrees Celsius.

Alternatively or additionally, the condition includes applying an aggregation function to the equality with respective key of a certain pair and comparison based on predefined order applied to the value. The feature may include nested conditions, such as applying the order based relation to one or more (e.g., each) members of the set of key-value pairs to generate a second set of sub-results, and applying the aggregation function to the second set of sub-results. Such features may be used to generate features that look up elements in sets. For example, features that result the number of hours in the day with temperatures below 40 degrees Fahrenheit. In another example, a feature returns the first time in the day when the temperature exceeded 75 degrees Fahrenheit.

The classification feature may be mathematically represented as: mix(func(o), dataPoint), where func is the function described herein, mix is the condition described herein, and dataPoint is selected using the results of func(o) on the training data. Examples of dataPoint include: one or more of the objects (or portion(s) thereof) returned by func(o), a member of the collection when func(o) returns a collection, and a key when func(o) returns a type which may be viewed as a map.

At 110, each generated classification feature from the set of generated classification features is applied to raw data. The raw data may include the training data set and/or other test data, for example, the raw data may overlap with the designated training set (of block 102), may be the designated training set (i.e., the same set), and/or may include other data. The raw data may be unclassified. Applying the generated features generates a set of extracted features, optionally as a feature vector or other representation.

At 112, a subset of pivotal classification features is selected from the set of generated classification features. Selection of the subset of pivotal classification features may be according to one or more correlation requirements between one or more classification variables and each respective member of the set of extracted classification features. The feature used to generate the correlated extracted feature may be selected.

Correlation requirements may include, for example, a value above a correlation threshold, for example, on a scale of 0-1, a value of greater than 0.7, or 0.8, or 0.9, or other smaller, intermediate or larger values.

Alternatively or additionally, selection is based on other requirements (which may be defined as other correlation requirements), for example, computation time and/or computation resource requirements (e.g., memory, processor). For example, features which have low computation requirements below a threshold and/or low computation time below a threshold may be selected over other feature that do not meet the time and/or resource requirements. The computational resource requirement may be selected based on the target computer that may be performing the classification using the trained classifier, which may be the same or a different computing unit than the computer that generates the features and/or trains the classifier. For example, the correlation requirement may include a predefined time threshold representing a maximal time to perform the classification on a Smartphone (or other mobile device) having standard processing capabilities. In another example, the correlation requirement may be based on a web server performing the classification by allocating limited resources to the classifier.

The correlation requirements may be provided by the user via the user interface, automatically generated by code (e.g., by mapping resources of the target computer), and/or based on estimated time and/or target resources (e.g., generated from a model and/or read from a file).

Feature selection may be performed, for example, using methods described with reference to with reference to related U.S. patent application Ser. No. 14/595,394, filed Jan. 13, 2015, title "FUNCTION STREAM BASED ANALYSIS", by some of the same inventors, the contents of which are incorporated herein by reference in their entirety, or other methods, for example, a statistical correlation evaluated using techniques such as Chi-Squared, Information gain, Pearson correlation and/or others evaluation techniques.

The classification variable may be manually provided by the user using the user interface, automatically determined by code, and/or obtained from a different location, such as a file stored locally or remotely.

The classification variable may be, for example, a set of rules, a ratio reflecting a desired data segmentation and/or a question, for example which parameters of a data instance and/or object are indicative of a desired event, for instance which user characteristics of a data instance and/or object representing a visit of a browsing user in a webpage are commonly found in purchasing consumers, which soil characteristics of a data instance and/or object representing measurements of a soil specimen are commonly found in a stratum of natural resources, such as gold, diamonds, tanzanite, nickel, uranium and/or natural gas, and which electronic consumption pattern of a data instance and/or object representing electronic consumption measurements in a household are commonly found in a household having a malfunctioning consumer product, such as refrigerator, washing machine and/or the like.

At 114, the selected subset of pivotal classification features is provided, optionally documented by being stored in a generated pivotal classification feature repository 216 on storage unit 210, on server 224, or other locations.

The pivotal classification features are stored as a new dataset, representing newly created data.

At 116, the selected subset of pivotal classification features are used to generate a predictive and/or classification machine learning model. The subset of pivotal features may be used to train a statistical classifier.

Training may be performed using the training dataset of block 102 (or portions thereof), and/or other training data.

The subset of features is applied to the designated data instances to generate extracted features, optionally as feature vectors. The feature vectors along with labels of the data instances (or other clustering techniques) may be used to train the classifier. Labeling may or may not be performed. Labeling may be performed, for example, manually by a user, or automatically by code using a labeling algorithm.

Training may be performed based on supervised and/or unsupervised learning methods, for example, linear classifiers, support vector machines, and k-nearest neighbor. The classifier may be built with regression and/or classification algorithms. Different metrics, for example Precision, F-measure, and area under Receiver operating characteristic (ROC) curve, may be used to evaluate the performance of each of the classifier(s), with the related features selected accordingly.

The trained classifier may be stored on storage unit 210, on server 224, or at other locations, for example, as code, as a script, or other suitable representations. The trained classifier may be provided to computing units to analyze new data instances.

Optionally, at 118, the trained classifier is applied to a new received data instance, to generate a classification and/or predictive value.

Pivotal classification features are extracted from the new data instance by applying the set of pivotal classification features (or a selected sub-set thereof, for example, depending on relevancy and/or availability of the data). The extracted pivotal classification features are provided as input to the trained classifier to perform the classification and/or prediction. The result may be displayed to the user on a display, stored on a memory, or provided to another process, for example, to code that analyzes the results.

It is noted that the systems and/or methods described herein may be implemented with the systems and/or methods described with reference to related U.S. patent application Ser. No. 14/595,394. For example, applied stream functions described with reference to paragraphs [0061] and/or [0062] (i.e., block 106 of FIG. 1) of U.S. patent application Ser. No. 14/595,394, may be implemented by the systems and/or methods described herein that create the functions and/or generate the features described herein.

An example is now described with respect to the method of FIG. 1.

At 102, a raw unclassified dataset including vectors is provided. Each vector includes values for one day, having the parameters of one temperature measurement in degrees Celsius per hour. The dataset contains multiple vectors representing multiple days.

For example, the dataset is represented as the following table (for clarity, only 9 hours of the day are shown, and only 3 days are shown):

|  | 8 AM | 9 AM | 10 AM | 11 AM | Noon | 1 PM | 2 PM | 3 PM | 4 PM |
| --- | --- | --- | --- | --- | --- | --- | --- | --- | --- |
| Day 1 | −10° C. | −5° C. | 0° C. | 3° C. | 4° C. | 6° C. | 5° C. | 8° C. | 4° C. |
| Day 2 | 10° C. | 12° C. | 15° C. | 20° C. | 24° C. | 28° C. | 22° C. | 18° C. | 18° C. |
| Day 3 | 20° C. | 22° C. | 24° C. | 26° C. | 28° C. | 30° C. | 28° C. | 26° C. | 24° C. |

At 104, a function set is selected based on the ability to operate on vectors, for example, including the functions: Minimum, Maximum, Average, Median, and Variance.

At 106, each function is applied to each vector of each data instance. For example, applying the Maximum function to the three days generates the resulting set of first results {8° C., 28° C., 30° C.}. For example, applying the Minimum function to the three days generates the resulting set of first results {−10° C., 10° C., 20° C.}.

At 108, classification features are generated based on the applied function and a condition to each member of the set of first results. For example, for features of the form Max (v)>t, the following features are generated: Max(v)>8° C., Max(v)>28° C., and Max(v)>30° C. For example, for features of the form Min(v)<t, the following features are generated: Min(v)<−10° C., Min(v)<10° C., Min(v)<20° C.

At 110, the generated classification features are applied to the training data set, and/or to another test dataset of raw unclassified data.

At 112, a subset of pivotal classification features is selected according to a correlation requirement for predicting daily electricity consumption in a city. Applying statistical methods, the feature Max(v)>28° C. is determined to meet the correlation requirement with daily electricity consumption. Similarly, the method may identify that other classification features, for example, Min(v)<−10° C. which may meet a first correlation requirement do not meet one or more additional correlation requirements, for example, having inadequate variance and/or average.

At 114, the identified pivotal features, including Max(v)>28° C. are documented.

At 116, the subset of pivotal features, including Max(v)>28° C. are used to train a statistical classifier able to classify data instances including vectors of hourly temperatures to daily electricity consumption predictions.

At 118, the trained classifier is applied, for example, by an electric utility, to estimate future electricity consumption in a city according to a future forecast of hourly temperatures.

Another example is now described with respect to the method of FIG. 1.

At 102, a dataset including vectors is provided. The dataset includes data for multiple users, in the form of a vector associated with each user. Each vector includes texts that the user has read, such as text of news articles (e.g., read online).

For example, the dataset is represented as the following table (for clarity, only 3 users are shown, and only 3 articles per user are shown):

| User 1 | Article A | Article B | Article Q | Article H |
| User 2 | Article G | Article M | Article B | Article A |
| User 3 | Article G | Article D | Article F | Article Q |

At 104, a function set is selected based on the ability to operate on vectors of text (i.e., string) format. The function may be defined to process each article, by identifying the 3 most frequent topics from the respective article. A result flat vector of topics is generated, which includes the 3 most frequent topics from all articles in each vector. The 5 most frequent elements in the resulting flat vector are identified. The output of the function is, for each user (i.e., by operating on the vector associated with the user), a 5 term vector describing the main interests of the user.

At 106, the function is then applied to each vector of each data instance, to generate three first result vectors, for each respective user.

At 108, features are generated based on the applied function and a condition to each member of the set of first results. The condition may be related to a membership query, for membership in a set. Potential features are generated for each term in the outcome space of the function, determining whether one or more members of a 5 term vector calculated from a new received article are included in the outcome space of the first set of results. A feature is generated for each respective member of the first set of results, to determine whether one or more members of the 5 term vector calculated from the new received article match the respective member.

At 110, the generated features are applied to the training data set, and/or to another test dataset.

At 112, a subset of features is selected according to a correlation requirement for predicting whether a user that consumes news articles is interested in a certain topic. Applying statistical methods, the features that are most closely correlated with the target are selected.

At 114, the identified features are documented.

At 116, the subset of features are used to train a statistical classifier able to classify data instances including vectors of articles read by a user, to predict whether the user will be interested in the topic of the article or not, or other prediction criteria, such as whether the user will be highly interested, mildly interested, or not interested.

At 118, the trained classifier is applied, for example, by a news website, to predict which articles to send to a user according to which articles the user is interested in.

Yet another example is now described with respect to the method of FIG. 1.

At 102, a dataset including vectors is provided. The dataset includes data for multiple users, in the form of a vector associated with each user. Each vector includes books that the user has read, such as text of the books.

At 104, a function set is selected based on the ability to operate on vectors of text (i.e., string) format. The function may be defined to process each book, by identifying, for each book, one or more genres, for example, romance, fantasy, history, mystery, and the like.

For each book, a vector of genres is generates, which includes one or more genres identified in the book.

At 106, the function is then applied to each vector of each data instance, to generate first result vectors, for each respective user.

At 108, features are generated based on the applied function and a condition to each member of the set of first results. The condition may be related to a membership query, for membership in a set. Potential features are generated for each genre in the outcome space of the function, determining whether one or more genres identified for a new received book are included in the outcome space of the first set of results. A feature is generated for each respective genre of the first set of results, to determine whether one or more genres identified in the new received book match the respective genres of the first set of results.

At 110, the generated features are applied to the training data set, and/or to another test dataset.

At 112, a subset of features is selected according to a correlation requirement for predicting whether a user will like a new book. Applying statistical methods, the features that are most closely correlated with the target are selected.

At 114, the identified features are documented.

At 116, the subset of features are used to train a statistical classifier able to classify data instances including vectors of books read by a user, to predict whether the user will be interested in the genre of a new book or not, or other prediction criteria, such as whether the user will be highly interested, mildly interested, or not interested.

At 118, the trained classifier is applied, for example, by an online bookstore, to predict which new books to offer to a user according to which genres the user is interested in.

Reference is now made to FIGS. 3A-3D, which are screenshot of an exemplary implementation of the method of FIG. 1 and/or system of FIG. 2, in accordance with some embodiments of the present invention. The screenshots have been captured from a display (e.g. user interface 218). FIGS. 3A-3D depict a process of analyzing data related to movies released to movie theaters, including metadata related to the movie (e.g., release data, director, actors, and gross revenue). The classification variable includes magnitude of best box-office success.

Figure 3A:
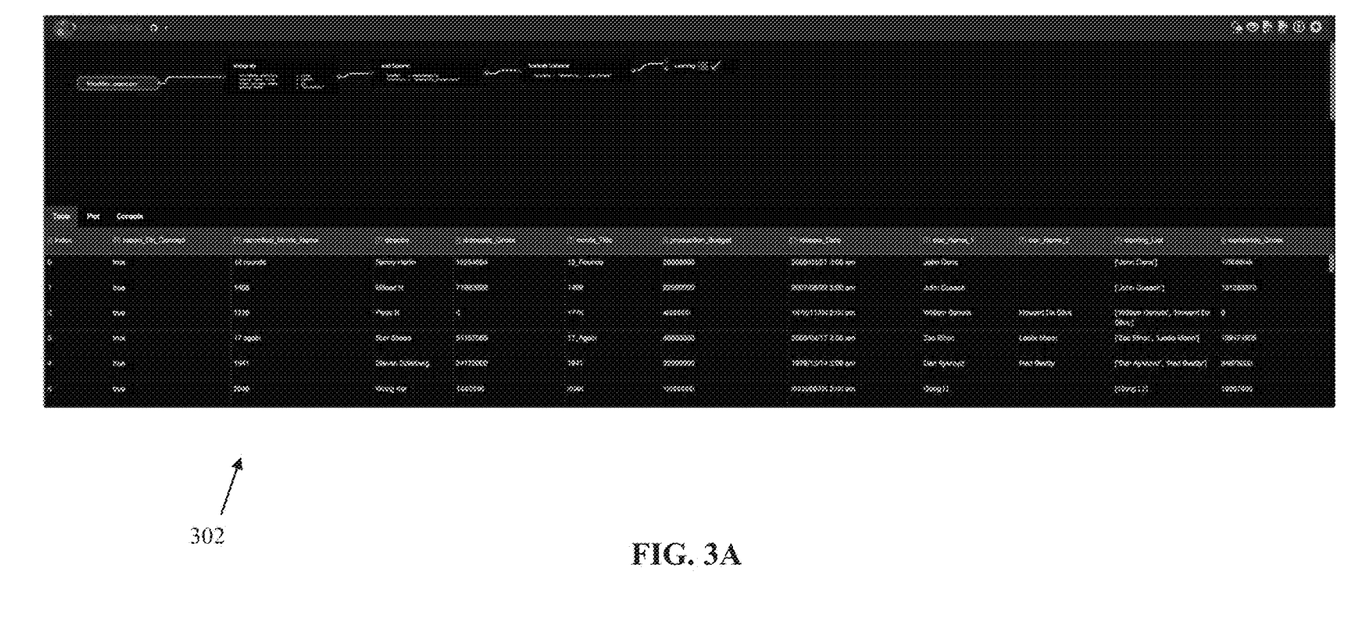
FIG. 3A is a screenshot of an exemplary implementation of the method of FIG. 1 and/or system of FIG. 2, in accordance with some embodiments of the present invention.

FIG. 3A depicts input of raw data, for example, as described with reference to block 102 (designating training dataset). The designated raw data is a table 302, with each row representing a data instance, and each column representing an object. Table 302 is designated for creation of the training dataset. The raw data instances in table 302 are unclassified.

Figure 3B:
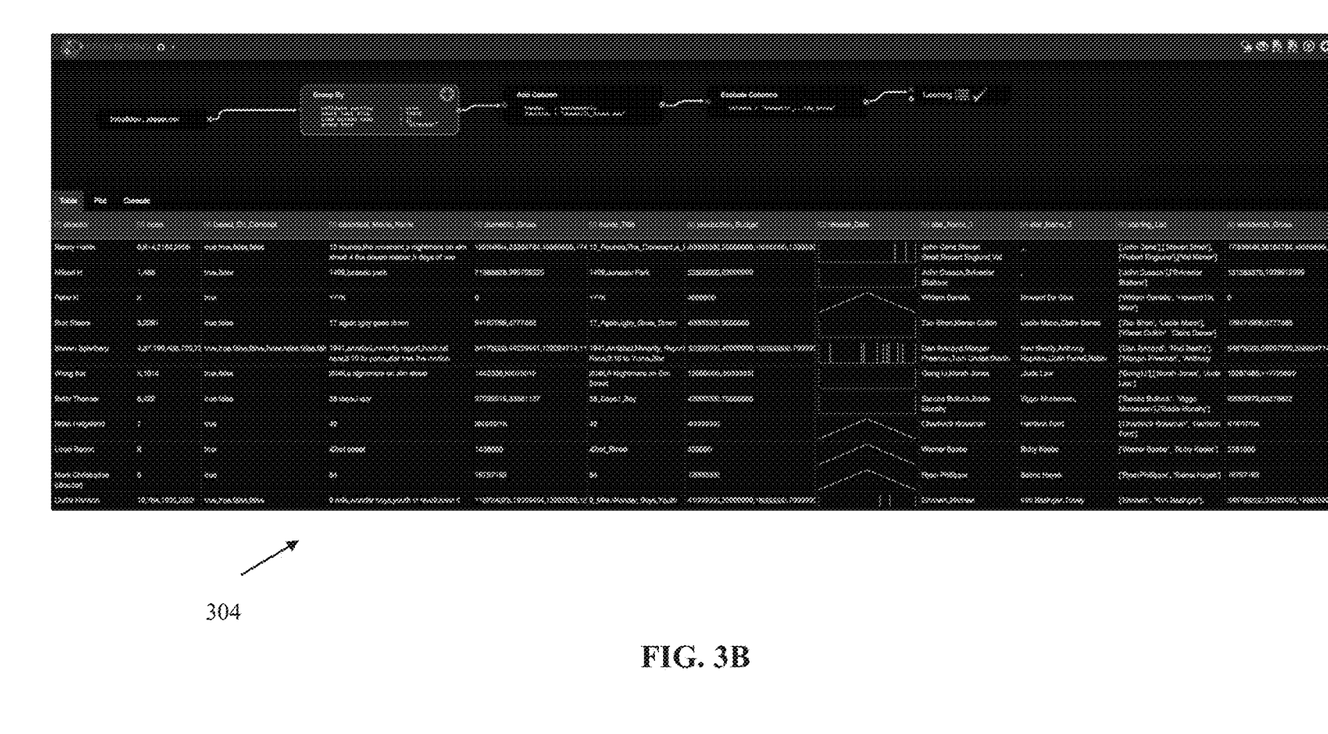
FIG. 3B is another screenshot of an exemplary implementation of the method of FIG. 1 and/or system of FIG. 2, in accordance with some embodiments of the present invention.

FIG. 3B depicts table 304, which is generated by processing table 302 of FIG. 3A, having data grouped according to director name. It is noted that complex data types may be generated. Each row corresponds to one director, and includes metadata related to the movies directs by the respective director organized in columns as objects. The data in each column may be represented by objects, such as vectors of different types (e.g., integer, double, string, Boolean) and/or time series objects (e.g., release data). Table 304 is designated as the training dataset.

Figure 3C:
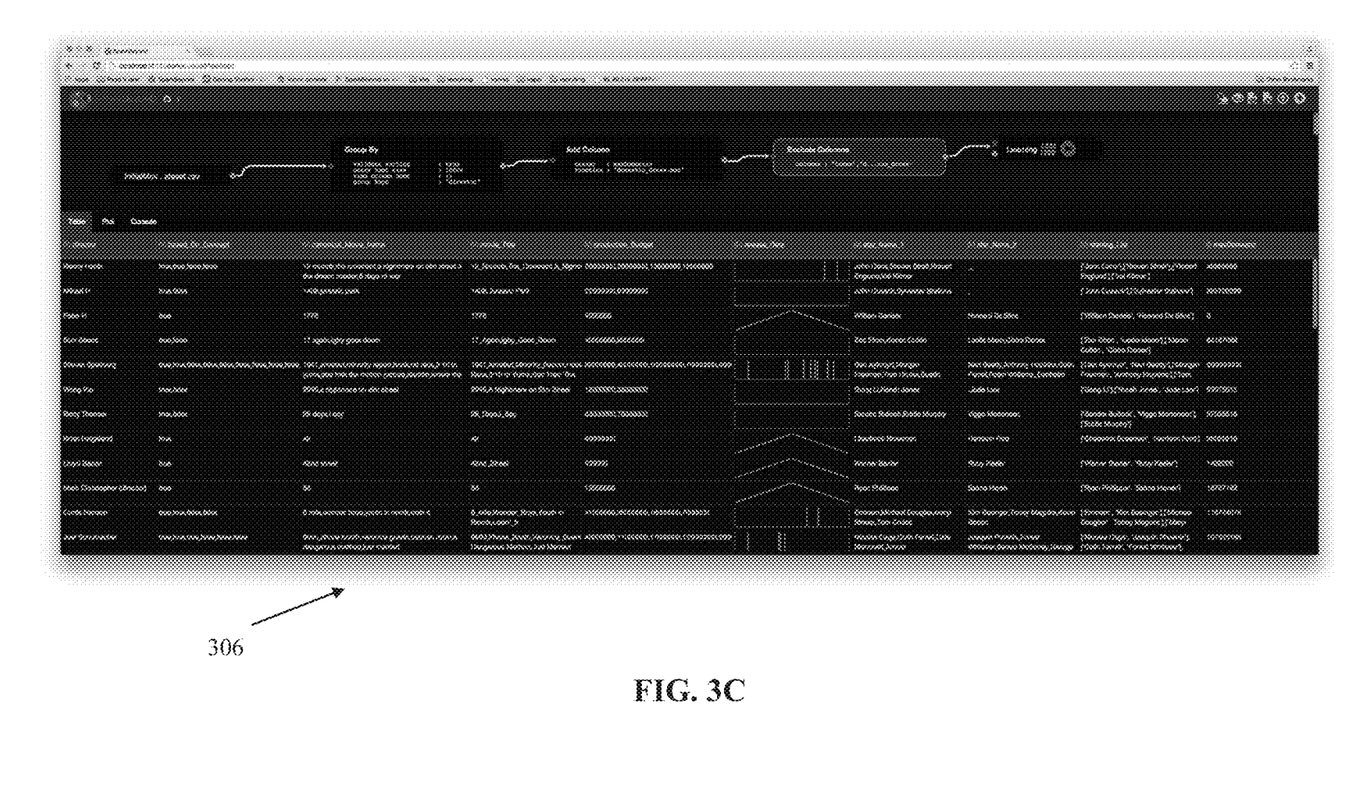
FIG. 3C is yet another screenshot of an exemplary implementation of the method of FIG. 1 and/or system of FIG. 2, in accordance with some embodiments of the present invention.

FIG. 3C depicts table 306, which is generated by processing table 304 of FIG. 3B. The last column of table 306 (maxDomestic) is a new created object (i.e., column), generated by applying a function that calculates the maximum value to the domestic_Gross object (i.e., column) of table 304. The maxDomestic column is designated as the target classification variable. It is noted that irrelevant columns (e.g., statistically insignificant for classification to the target classification variable) have been removed, for example, index, and worldwide_Gross.

Figure 3D:
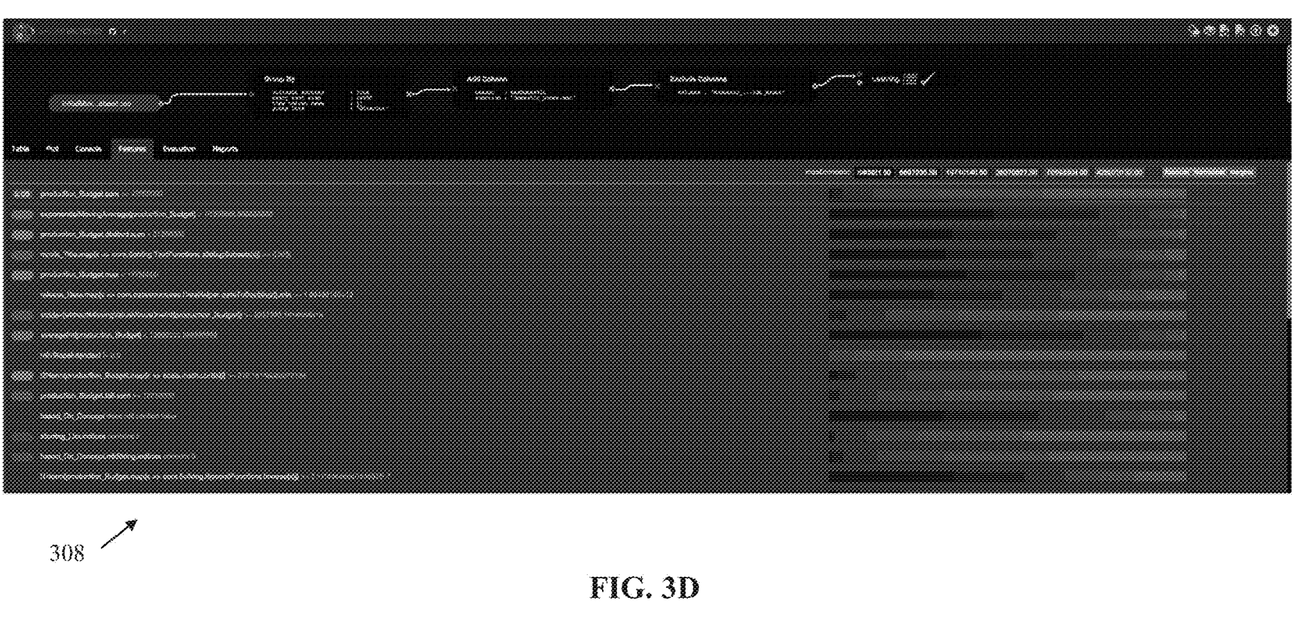
FIG. 3D is yet another screenshot of an exemplary implementation of the method of FIG. 1 and/or system of FIG. 2, in accordance with some embodiments of the present invention.

FIG. 3D depicts a subset of pivotal classification features 308 generated by applying the method of FIG. 1 and/or the system of FIG. 2 to table 306 of FIG. 3C. The pivotal classification features may include complex expressions including complex data types discovered by the systems and/or methods described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant machine learning algorithms will be developed and the scope of the term classifier is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for generating a statistical classifier, comprising:
receiving a designation of a training dataset comprising a plurality of raw data instances each including a set of data objects assigned at least one value;
applying a function to each raw data instance to calculate a set of first results comprising a collection of complex objects having a plurality of parameters built from a plurality of primitive types, wherein the function is selected from a plurality of functions;
extracting a plurality of values from the set of first results;
generating a plurality of candidate classification features, each respective candidate classification feature including:
(i) the function that outputs a complex object, selected from the plurality of functions,
(ii) at least one condition selected from a plurality of conditions, and
(iii) a value selected from the plurality of extracted values,
wherein the respective candidate classification feature outputs an output value computed by the at least one condition that compares between the complex object output of the function and the value selected from the plurality of extracted values;
selecting a subset of pivotal classification features from the generated candidate classification features according to a correlation requirement between at least one classification variable and each respective candidate classification feature;
and
generating a statistical classifier for classification of the at least one classification variable based on the selected subset of pivotal features applied to a new training dataset.

2. The method of claim 1, further comprising classifying a new data instance to the at least one classification variable by applying each classification feature of the selected subset of pivotal features to the new data instance to extract a plurality of features and applying the statistical classifier to the plurality of extracted features.

3. The method of claim 1, wherein applying the function comprises applying each function of a set of functions to each data instance to generate a plurality of sets of first results, wherein each respective function is adapted to process different objects.

4. The method of claim 1, wherein the at least one condition comprises equality with the value of the set of first results.

5. The method of claim 1, wherein the candidate classification feature outputs a value of a binary type according to the at least one condition that performs a contains operation between the complex object output of the function and the value of the set of first results.

6. The method of claim 1, wherein the at least one condition comprises the value of the set of first results or a value calculated from the value of the set of first results being greater-than or less-than an ordering of the complex object output.

7. The method of claim 1, wherein the set of first results includes a collection of key-value pairs each including a key component and a value component, wherein the value of the set of first results is selected by an aggregation function applied to the collection of key-value pairs, the at least one condition comprises verification of membership of a key component of the value of the set of first results in a key component of the complex object outputted by the function and wherein the at least one condition further compares between a value component of the complex object outputted by the function and a value component of the value of the set of first results.

8. The method of claim 7, wherein the at least one condition further computes whether the value component of the complex object outputted by the function is at least one of: greater-than, equal, or less-than, the value component of the value of the set of first results.

9. The method of claim 1, wherein the at least one condition further comprises an aggregation function applied to the complex object output of the function.

10. The method of claim 1, wherein the set of first results includes a collection of key-value pairs each including a key component and a value component, wherein the value of the set of first results is selected by creating for each common key component a set of the value components of the key-value pairs associated with the common key component, and wherein the at least one condition comprises equality of a key component of the value of the set of first results with a key component of the complex object outputted by the function, and wherein the at least one condition further compares between a value component of the complex object outputted by the function and a value component of the value of the set of first results.

11. The method of claim 10, wherein the at least one condition further compares comprises a member selected from the group consisting of: greater than, less than, and equal to.

12. The method of claim 1, wherein the complex objects include at least one member selected from a group consisting of: a set, time series, vector, map, graph, and tree.

13. The method of claim 1, wherein each instance includes at least two objects having a same data structure each including a plurality of parameters storing same representations of same data, and further comprising creating, for each same value of each parameter of the same data structure, a set of values of other parameters of the same data structure, and wherein applying the function to each data instance to generate the set of first results comprises applying the function to the set of values of the other parameters of the same data structure.

14. The method of claim 1, wherein the function of the generated set of classification features receives a complex type and outputs a complex type.

15. A system for generating a statistical classifier, comprising:
a data interface for communicating with a storage unit storing thereon at least one training dataset comprising a plurality of raw data instances each including a set of data objects assigned at least one value, and storing a plurality of functions adapted to process to each data instance to generate a plurality of sets of first results comprising a collection of complex objects having a plurality of parameters built from a plurality of primitive types;
a program store storing code; and
a processor coupled to the data interface and the program store for implementing the stored code, the code comprising:
code to apply at least one function from the plurality of functions to each data instance to calculate a set of first results comprising a collection of complex objects having a plurality of parameters built from a plurality of primitive types;

code to extract a plurality of values from the the set of first results;

code to generate a plurality of candidate classification features, each respective candidate classification feature including:
  (i) the function that outputs a complex object, selected from the plurality of functions,
  (ii) at least one condition selected from a plurality of conditions, and
  (iii) a value selected from the extracted values,
  wherein the respective candidate classification feature outputs an output value computed by the at least one condition that compares between the complex object output of the function and the value selected from the plurality of extracted values;

code to select a subset of pivotal features from the generated candidate classification features according to at least one correlation requirement between at least one classification variable and each respective candidate classification feature; and code to generate a statistical classifier for classification of the at least one classification variable based on the selected subset of pivotal features applied to a new training dataset.

16. The system of claim 15, further comprising a user interface coupled to the processor, the user interface set to allow a user to input the at least one classification variable.

17. The system of claim 15, further comprising a user interface coupled to the processor, the user interface set to allow a user to select the at least one function from the plurality of functions.

18. The system of claim 15, further comprising code to train a statistical classifier for classification of the at least one classification variable based on the selected subset of pivotal features applied to the at least one training dataset.

19. The system of claim 15, wherein the at least one correlation requirement includes a threshold for a predefined processing time for predicting the at least one classification variable using a target processing unit.

20. The method of claim 9, wherein the aggregation function is selected from the group comprising: minimum element in the set, number of elements in the set, size of the set, average value of elements in the set, and maximum element value in the set.

21. A computer program product comprising a non-transitory computer readable storage medium storing program code thereon for implementation by a processor of a system for generating a statistical classifier, the program code comprising:

instructions to receive a designated training dataset comprising a plurality of raw data instances each including a set of data assigned at least one value;

instructions to apply a function to each raw data instance to calculate a set of first results comprising a collection of complex objects having a plurality of parameters built from a plurality of primitive types, wherein the function is selected from a plurality of functions;

instructions to extract a plurality of values from the set of first results;

instructions to generate a plurality of candidate classification features, each respective candidate classification feature including:
  (i) the function that outputs the a complex object, selected from the plurality of functions,
  (ii) at least one condition selected from a plurality of conditions, and
  (iii) a value selected from the plurality of extracted values,
  wherein the respective candidate classification feature outputs an output value computed by the at least one condition that compares between the complex object output of the function and the value selected from the plurality of extracted values;

instructions to select a subset of pivotal classification features from the generated candidate classification features according to a correlation requirement between at least one classification variable and each respective candidate classification feature; and instructions to generate a statistical classifier for classification of the at least one classification variable based on the selected subset of pivotal features applied to a new training dataset.

* * * * *